United States Patent
Ochiai

[15] 3,640,839
[45] Feb. 8, 1972

[54] FILTER PAPER FOR OIL FILTERS
[72] Inventor: Tuguo Ochiai, Kanagawa, Japan
[73] Assignee: Tokyo Roki Kabushiki Kaisha, Kanagawa, Japan
[22] Filed: Sept. 5, 1968
[21] Appl. No.: 767,547

[30] Foreign Application Priority Data
July 13, 1968 Japan.....................................43/49204

[52] U.S. Cl..............................162/129, 162/133, 162/304, 210/491
[51] Int. Cl....................................B07b 11/04, D21f 11/08
[58] Field of Search........................210/489, 490, 491, 498; 162/123, 132, 129, 304, 133, 296

[56] References Cited

UNITED STATES PATENTS 2,675,127   4/1954   Layte..............................210/489 X
3,322,617   5/1967   Osborne................................162/296

Primary Examiner—S. Leon Bashore
Assistant Examiner—Richard H. Tushin
Attorney—Richards & Geier

[57] ABSTRACT

A filter paper for oil filters has a coarse web capable of passing particles of granular size of about 40 $\mu$ maximum diameter and a plurality of dense web strips superposed in parallel upon the coarse web and combined therewith at fixed intervals, the dense web being capable of passing particles of granular size of about 15 $\mu$ maximum diameter.

2 Claims, 8 Drawing Figures

INVENTOR:
T. Ochiai
BY Richards & Geier
ATTORNEYS

INVENTOR:
T. Ochiai
BY
Richards & Geier
ATTORNEYS

FILTER PAPER FOR OIL FILTERS

BACKGROUND OF THE INVENTION

This invention relates to filter papers for oil filters and refers more particularly to filter papers and adaptable for the filtering system of the full-flow type.

In general, oil filters should have simultaneously a cleansing function, by which sludges in lubrication oil will be removed, and a screening function, by which contaminants resulting from the wear and tear of the sliding parts of a machine will be removed. For this purpose it is conventional to use a pleat-type dense filter paper as a filter element for full-flow filtering. In the pleat type a wider filter area results in small pressure losses while in use, and its pore size is relatively easy to control. On the other hand, this filter paper has the drawback that, when it is dense and homogeneous enough to remove minute particles in the oil, its pores are easily closed by the particles so that the service life of the filter paper is a short one.

Recently, there has been provided a combination of a pleat-type filter paper, which has high filtering efficiency, with an insert of depth type in which synthetic fibers are combined with a binder, for use as a filter element for full-flow filtering, but difficulties were encountered in manufacturing and constructing it.

Furthermore, two kinds of filters are known, namely a bypass filter through which oil is directly returned to an oil pan and a full-flow-type filter through which all of the oil to be sent to the bearing is passed. This combination filter is used for heavy-duty engines, but it is not in general use due to the restriction of space in which it must be fitted and for economic reasons.

SUMMARY OF THE INVENTION

An object of the present invention is to provide a filter paper having cleansing and screening functions and, simultaneously, an extended service life.

Another object of the present invention is to provide a filter paper of excellent filtering efficiency and extended service life.

A further object of the present invention is to provide a filter paper which will not be torn off when it is bent by a pleat machine.

Other objects of the present invention will become apparent in the course of the following specification.

In the accomplishment of the objectives of the present invention it was found desirable to provide a filter paper for oil filters comprising a coarse web capable of passing particles of granular size of about 40$\mu$ maximum diameter and a plurality of dense web strips superposed in parallel upon the coarse web and combined therewith at fixed intervals, the dense web being capable of passing particles of granular size of about 15$\mu$ maximum diameter.

The invention will appear more clearly from the following detailed description when taken in connection with the accompanying drawings, showing by way of example, preferred embodiments of the inventive idea.

FIGS. 1 to 4 show filter papers 10, 10a, 10b and 10c, respectively, which are made by superposing relatively dense wet webs 30 upon relatively coarse wet webs 20 and combining them by pasting or the like. The filter paper is so constructed that it comprises, as a vertical sectioned view, double layer parts in which a dense web is superposed upon a coarse web. Some filters may also have single layer parts of a coarse web.

Preferably, the granular sizes capable of passing through the coarse web and the dense web are a maximum of about 40$\mu$ diameter and 15$\mu$ diameter respectively, as compared to a maximum of about 25$\mu$ diameter for conventional filter paper.

The fiber mixing proportion of the coarse web is by weight from 40 to 60 percent of cotton fiber and from 60 to 40 percent of rayon (from 1.5 to 7 denier thick and from 5 to 10 mm. staple length), while the dense web consists of 100 percent cotton fibers.

When oil which is being filtrated is circulating through this filter paper, the double layer parts will carry out the cleansing function so that minute particles in oil will be removed, while the single layer parts will carry out the screening function so that particles which may have bad influence on the wear of the machine will be removed.

When the double layer parts are closed by dust and dirt, the single layer parts will also become closed by them, so that not only the filtering function will not be lowered as a whole, but also the cleansing efficiency for oil will be raised compared with that at the beginning of use. Furthermore, with this construction, the service life of the filter paper will also be extended. The plane of the dense web may be of any shape.

Figure 1:
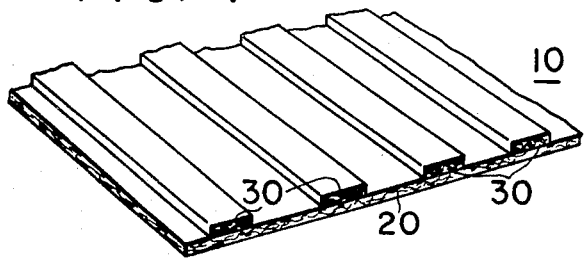
FIGS. 1, 2, 3 and 4 are partial perspective views of filter papers of different structures made according to the present invention.

In the example shown in FIG. 1, the layer of dense web is arranged in parallel longitudinal stripes.

Figure 2:
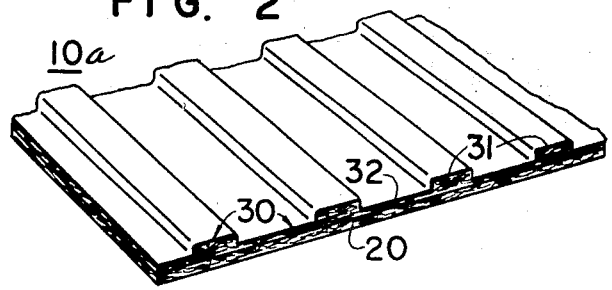

In the example shown in FIG. 2, very thin dense web parts 32 extend between thick dense web stripes 31 and upon the coarse web 20.

Figure 3:
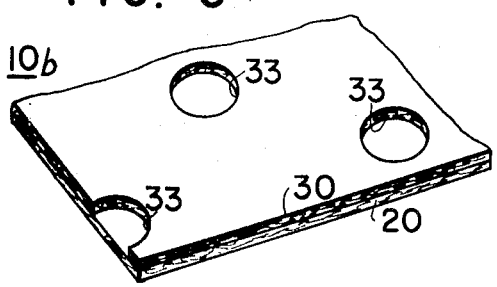
Figure 4:
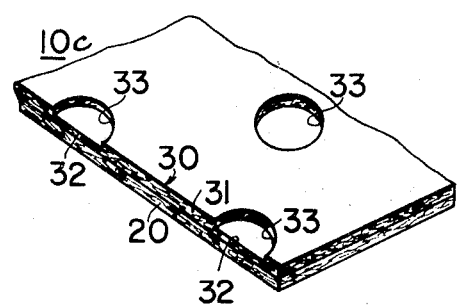

In the examples shown in FIGS. 3 and 4, the dense web 30 is regularly punched forming holes 33. The construction of FIG. 4 has an additional very thin dense web layer 32.

The ratio of planar exposed surface area of a plurality of dense webs to that of exposed coarse web is in the range of 10:5 to 10:10. If stress is laid upon the filtering efficiency of the filter paper, the desirable ratio is 10:6. If greater value is placed on the service life, the ratio should be 10:10.

In the constructions shown in FIGS. 2 and 4, relatively thick dense web parts are connected with the very thin dense web parts 32 and all dense web parts are combined by being pasted upon the coarse web 20. Therefore, the filter paper of these constructions will hardly be torn off even if the filter is bent by the pleat machine. Furthermore, the strength of the filter is increased by these structures. In order to keep high degree of filtration for oil, the thickness of the web parts 32 should be as small as possible.

When a filter element is constructed by applying this filter paper, it is important that the filter paper should be so arranged that oil may flow through from the side of the coarse web 20.

If oil flows through the filter paper from the dense web side the minute particles which may not be removed by the dense web can no longer be removed by the coarse web 20 and thus the coarse web will be of no use.

In order to make not only the coarse web but also the dense web for the filter paper of this invention by the use of known paper machines, such as the Fourdrinier machine 50 (FIG. 5) or cylinder machine 60 (FIG. 7), in accordance with the present invention, flexible covers are applied on the surface of the moving endless belt of wire cloth (the Fourdrinier wire) or on the surface of the wire-covered cylinder or mold, by which wet dense web is made, so that the mesh of the wire may be closed partially by the covers. As the flexible cover, for example, an adhesive sheet, a narrow steel plate or the like can be used. These covers are fitted on the moving belt or cylinder in rows at fixed intervals. Also the surface of the wire may be covered with a cloth upon which holes are regularly formed.

In operation, when fiber-water mixture is supplied to the wire so that the surface of the liquid will be above the upper surface of the covers, a relatively thick web 31 is provided between the covers, and on the contrary a very thin web 32 is provided upon each cover. Therefore, in accordance with this method, it is very easy to connect the relatively thick web parts 31 with the very thin web parts 32. When the fiber-water mixture is supplied to the wire so that the liquid surface thereof is below the surface of the covers, a relatively thick web 30 only is provided separately between the covers thus providing a plurality of parallel strips 30 shown in FIG. 1.

Instead of placing flexible covers on the surface of the wire to close the wire meshes, a comb-teeth-shaped guiding plate 62 (FIG. 7) may be provided opposite a cylindrical forming roll 61 with the spaces or slots of the plate facing the roll so that paper is formed therein.

Moreover, in order to provide two different wide and narrow spaces between the surface of the Fourdrinier wire or wire-covered mold and a guiding plate, the guiding plate for the fiber-water mixture having a surface with rectangular projections is fixed opposite the Fourdrinier wire or wire-covered mold, so that the fiber-water mixture may flow between the spaces.

The wet dense web made in accordance with the above method is combined with the coarse web to make a filter paper of the present invention.

Figure 5:
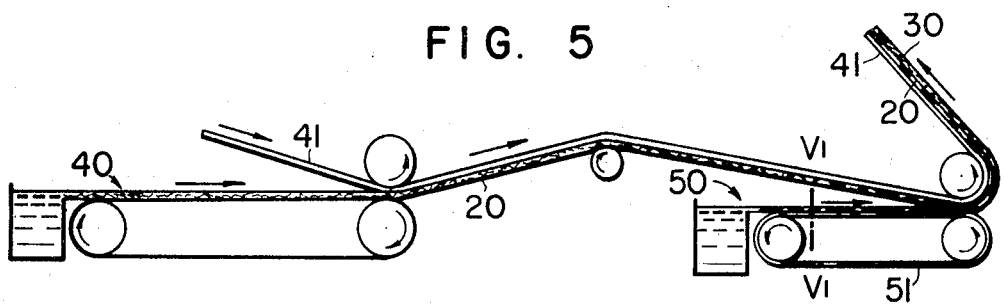
FIG. 5 is a diagrammatic side view of an apparatus for making a filter paper of the present invention.
Figure 6:
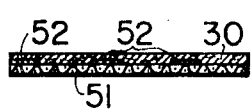
FIG. 6 is a vertical section along the line VI—VI in FIG. 5.

In accordance with the procedure illustrated in FIGS. 5 and 6, a fiber-water mixture, which is the starting material, is used in which the fiber mixing proportion is 50 percent of cotton fiber and 50 percent of rayon fiber. This mixture is applied to the paper making machine 40 and the wet web 20, through which the granules of a maximum $40\mu$ diameter may pass, is made in accordance with the conventional method.

The fiber-water mixture wherein the fiber is 100 percent cotton is applied to another paper-making machine 50 having a plurality of thin steel plates 52 which are 6 mm. wide and spaced to the extent of 10 mm. These plates are fitted in the lengthwise direction around the wire mesh 51 so that a wet web 30, through which granules of a maximum diameter of $15\mu$ may pass, is made.

The wet web 30 made by arranging the liquid surface of the fiber-water mixture is combined with the other web 20 attached to and carried by woolen fabric or felt 41 so that the filter paper is made.

Instead of the thin steel plates 52, a cloth having regularly arranged holes of 5 mm. diameter forming squares of 10 mm. may cover the surface of the endless wire. In the same process as described above, the dense web 30 made by the liquid surface of the fiber-water mixture is combined with the coarse web 20 to make a filter paper shown in FIGS. 3 and 4.

Figure 7:
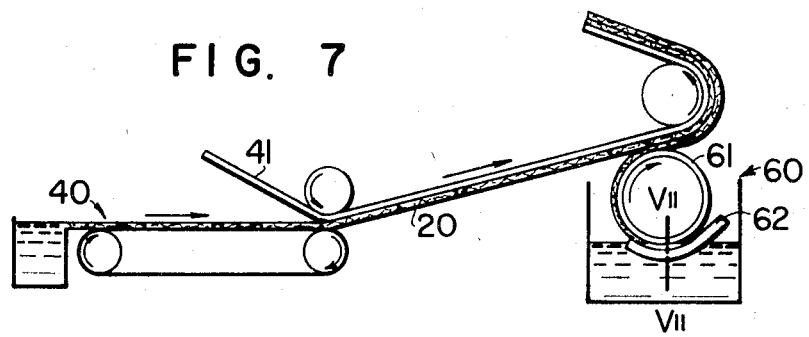
FIG. 7 is a diagrammatic side view of a somewhat different apparatus for making a filter paper.
Figure 8:
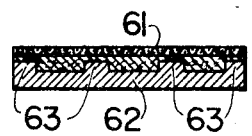
FIG. 8 is a vertical section along the line VIII—VIII in FIG. 7.

In the embodiment shown in FIGS. 7 and 8, wet web 30 is made by using a cylinder machine 60 in which a guiding plate 62 is fixed opposite to the cylindrical wire 61 for paper making. The surface of the guiding plate 62 opposite to the cylindrical wire 61 is provided with regularly arranged longitudinal rectangular portions 63. The fiber-water mixture is supplied to the narrow and wide spaces between the cylindrical wire and the guiding plate to make a web. Otherwise this process is the same as the one previously described. When the structure of FIG. 7 produces a dense web having strips such as 31 and thin dense web parts such as 32 the thin web is separated from the coarse web by the strips.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are included therein.

What is claimed is:

1. A filter paper for oil filters, consisting of coarse web made mainly of cotton fiber and rayon, said coarse web being able to be passed by particles of granular size about $40\mu$ in maximum diameter, and a plurality of dense web strips made mainly of cotton fiber and joined in parallel to said coarse web at fixed intervals, said dense web strips being able to be passed by particles of granular size about $15\mu$ in maximum diameter.

2. A filter paper in accordance with claim 1, wherein the ratio of planar exposed surface area of the plurality of dense web strips to that of coarse web is in the range of 10:5 to 10:10.

* * * * *